US011959295B2

(12) United States Patent
Scott et al.

(10) Patent No.: US 11,959,295 B2
(45) Date of Patent: Apr. 16, 2024

(54) POLE SUPPORT

(71) Applicants: Ian Scott, East Fremantle (AU); Fernando Andres Urrutia Conus, Victoria Park (AU)

(72) Inventors: Ian Scott, East Fremantle (AU); Fernando Andres Urrutia Conus, Victoria Park (AU)

( * ) Notice: Subject to any disclaimer, the term of this patent is extended or adjusted under 35 U.S.C. 154(b) by 143 days.

(21) Appl. No.: 17/591,768

(22) Filed: Feb. 3, 2022

(65) Prior Publication Data

US 2022/0243491 A1 Aug. 4, 2022

(30) Foreign Application Priority Data

Feb. 3, 2021 (AU) ................................ 2021900236

(51) Int. Cl.

*E04H 12/22* (2006.01)
*E01F 9/677* (2016.01)
*E01F 13/02* (2006.01)
*E05B 57/00* (2006.01)
*E01F 9/60* (2016.01)
*E05B 15/00* (2006.01)

(52) U.S. Cl.

CPC ......... *E04H 12/2269* (2013.01); *E01F 9/677* (2016.02); *E01F 13/026* (2013.01); *E05B 57/00* (2013.01); *E01F 9/60* (2016.02); *E05B 15/0093* (2013.01)

(58) Field of Classification Search

CPC ....... E01F 13/024; E01F 9/677; E01F 13/026; E01F 9/60; E05B 53/00; E05B 15/0093; E05B 57/00; E04H 12/2269
USPC .......................................................... 248/523
See application file for complete search history.

(56) References Cited

U.S. PATENT DOCUMENTS

| | | | | | |
|---|---|---|---|---|---|
| 1,515,611 | A | | 11/1924 | O'Connor | |
| 2,156,984 | A | * | 5/1939 | Haupt | A45B 19/04 248/408 |
| 3,098,542 | A | * | 7/1963 | Wallace | B66F 7/18 187/206 |
| 3,363,724 | A | * | 1/1968 | Quatkemeyer | B66F 7/18 187/206 |
| 4,003,161 | A | | 1/1977 | Collins | |
| 4,142,749 | A | * | 3/1979 | Heald | E05B 65/0007 292/130 |
| 4,531,614 | A | * | 7/1985 | Naegeli | B66F 7/04 254/89 H |

(Continued)

FOREIGN PATENT DOCUMENTS

| | | | | | |
|---|---|---|---|---|---|
| GB | 2264730 | A | * | 9/1993 | E01F 9/685 |
| GB | 2275289 | A | * | 8/1994 | E01F 13/026 |

*Primary Examiner* — Taylor Morris
(74) *Attorney, Agent, or Firm* — Price Heneveld LLP

(57) ABSTRACT

There is disclosed a pole support for removably supporting a hollow tubular pole, wherein the pole has a latching recess provided along its length. The pole support includes a housing defining a socket that is open at its operative upper end for receiving the pole. A latch is located within the socket and is mounted on a pivot to be pivotally movable between a latched position and an unlatched position. The latch has a latching arm extending on one side of the pivot and a ballast arm extending on an opposed side of the pivot, wherein a centre-of-weight of the latch is located off-centre from the pivot in the ballast arm so that ballast arm normally biases latch under gravity into its latched position.

18 Claims, 6 Drawing Sheets

(56) References Cited

U.S. PATENT DOCUMENTS

| | | | | |
|---|---|---|---|---|
| 4,830,415 | A * | 5/1989 | Nelson | E05B 65/0823 292/DIG. 32 |
| 4,833,566 | A * | 5/1989 | Nickola | H02B 1/50 248/156 |
| 5,018,902 | A | 5/1991 | Miller et al. | |
| 5,192,159 | A | 3/1993 | Higginson | |
| 5,337,989 | A * | 8/1994 | Apple | E04H 12/2269 52/165 |
| 5,365,694 | A * | 11/1994 | Macaluso | E01F 13/046 49/131 |
| 5,383,644 | A * | 1/1995 | Huse | F16M 11/041 248/501 |
| 5,441,359 | A | 8/1995 | Filippi | |
| 5,462,380 | A * | 10/1995 | Peek | A61G 5/12 285/308 |
| 5,492,429 | A * | 2/1996 | Hodges | E01F 9/685 40/607.04 |
| 5,625,988 | A | 5/1997 | Killick | |
| 5,961,249 | A * | 10/1999 | Hansen | E01F 13/026 49/35 |
| 6,382,358 | B1 * | 5/2002 | Kritzer | B66F 7/04 187/363 |
| 6,409,419 | B1 * | 6/2002 | Hernandez | E01F 13/04 404/6 |
| 6,560,935 | B1 | 5/2003 | Barefield | |
| 7,003,919 | B2 | 2/2006 | Riker | |
| 7,055,807 | B2 | 6/2006 | Pesta | |
| 7,150,579 | B2 * | 12/2006 | Newton | E01F 9/685 403/372 |
| 7,219,768 | B2 * | 5/2007 | Climenhaga | B66F 7/18 187/203 |
| 7,222,892 | B2 * | 5/2007 | Guidetti | F16B 2/246 292/306 |
| 7,334,957 | B2 * | 2/2008 | Sadinsky | E04H 12/2269 403/109.8 |
| 7,438,668 | B1 * | 10/2008 | Watry | A63K 3/043 482/17 |
| 7,472,891 | B2 * | 1/2009 | Schram | E05B 53/00 256/65.14 |
| 7,614,819 | B1 | 11/2009 | Mirman et al. | |
| 7,722,285 | B2 | 5/2010 | Schram et al. | |
| 8,297,873 | B1 | 10/2012 | Schram et al. | |
| 8,376,650 | B2 * | 2/2013 | Hild | E01F 9/635 404/9 |
| 9,427,854 | B2 * | 8/2016 | Leighton | B25G 1/04 |
| 9,717,974 | B2 | 8/2017 | Hahn et al. | |
| 9,719,272 | B1 * | 8/2017 | Torsiello, Jr. | E01F 9/629 |
| 11,105,056 | B1 * | 8/2021 | Christopherson | E01F 9/692 |
| 2013/0192149 | A1 * | 8/2013 | Roach | E01F 13/026 52/165 |
| 2022/0333398 | A1 * | 10/2022 | Pierman | A45B 11/00 |

* cited by examiner

POLE SUPPORT

CROSS-REFERENCE TO RELATED APPLICATIONS

This application claims priority to Australian Provisional Application No. 2021900236, filed on Feb. 3, 2021, entitled, “POLE SUPPORT,” the disclosure to which is hereby incorporated herein by reference in its entirety.

TECHNICAL FIELD

The present disclosure relates to a pole support.

More particularly, the present disclosure relates to a pole support configured to removably support the pole, for example, removably supporting poles of roadside signboards.

BACKGROUND

Traffic signboards are located at various locations along a roadside to indicate information to users of the road, for example to indicate driving rules such as speed limits, to provide placenames or distances to such places, or to indicate temporary warnings of hazardous road conditions. Larger traffic signboards may be supported on bridge crossovers or on gantries that span the width of the road, whereas smaller traffic signboards are commonly mounted on support poles that are embedded in or mounted to a concrete foundation buried in the ground at the side of the road.

Although the signboards and their supporting poles are relatively hard wearing, they do undergo weathering and thus require maintenance from time to time. For example, the support poles may require painting to avoid rust, particularly in the area near to the ground that may be impacted by detrimental ground chemistry. Sometimes it is also necessary to repaint the actual signboard if the paint peels due to sun and/or rain exposure. Although the maintenance can be done on site, this can be cumbersome as mobile repairs do not always have all the necessary equipment to perform the repairs. In some instances, the ability to do the repairs are also delayed by inclement weather—heavy rain typically prevents the painting of the support poles.

Further, it is unfortunately a rather common occurrence in traffic accidents that vehicles collide with the support poles and damage them and therefore the support poles need to be replaced. When mounted in concrete foundations, a rather considerable effort is required to dig up the foundations to extract the poles.

The conducting of any roadside maintenance or repair work is also potentially dangerous to the workers due to their proximity to travelling vehicles. To avoid the potential for harm, the authorities temporarily change the traffic rules in the vicinity of the work, whereby cars need to travel at slower speeds or lanes are closed off. This can be bothersome for vehicle drivers.

For at least these reasons, it would be easier and safer to be able to remove or replace the support poles and then perform the necessary maintenance at a central warehouse or depot.

It is to be understood that, if any prior art publication is referred to herein, such reference does not constitute an admission that the publication forms a part of the common general knowledge in the art, in Australia or any other country.

SUMMARY OF THE DISCLOSURE

According to one aspect of the present disclosure, a pole support for removably supporting a hollow tubular pole with a latching recess provided along its length includes a housing that defines a socket. The socket is open at its operative upper end to receive the hollow tubular pole. A latch is located within the socket and is mounted on a pivot and pivotally movable between a latched position and an unlatched position. The latch includes a latching arm that extends on one side of the pivot and a ballast arm that extends on an opposed side of the pivot. A centre-of-weight of the latch is located off-centre from the pivot in the ballast arm. The ballast arm is configured to normally bias latch into the latched position. In use, the latching arm is configured to extend into the latching recess of the hollow tubular pole that is supported within the socket.

These and other features, advantages, and objects of the present disclosure will be further understood and appreciated by those skilled in the art by reference to the following specification, claims, and appended drawings.

BRIEF DESCRIPTION OF THE DRAWINGS

The above and other features will become more apparent from the following description and with reference to the accompanying schematic drawings. In the drawings, which are given for purpose of illustration only and are not intended to be in any way limiting.

Figure 1:
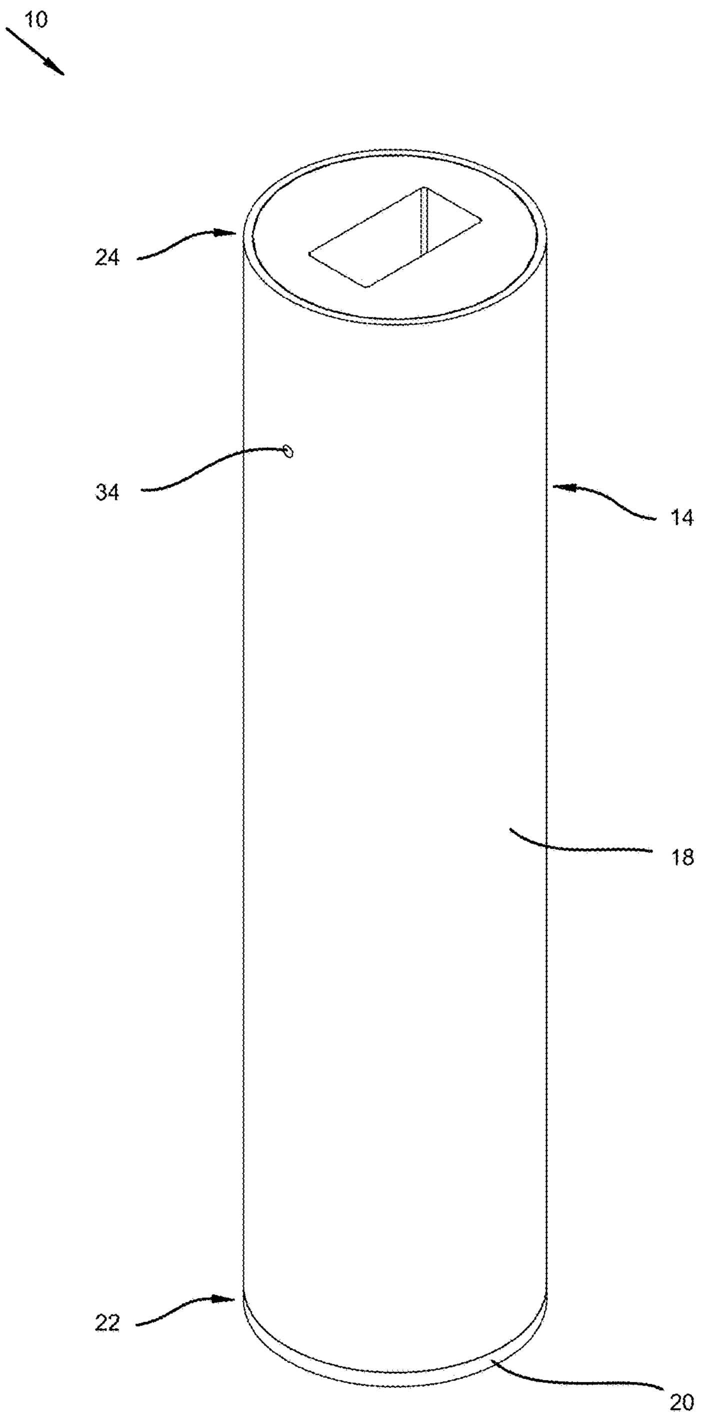
FIG. 1 is a perspective view of a pole support.

The components in the figures are not necessarily to scale, emphasis instead being placed upon illustrating the principles described herein.

DETAILED DESCRIPTION

The present illustrated embodiments reside primarily in combinations of method steps and apparatus components related to a pole support. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal,” and derivatives thereof shall relate to the disclosure as oriented in FIG. 1. Unless stated otherwise, the term “front” shall refer to the surface of the element closer to an intended viewer, and the term “rear” shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The present disclosure relates to a pole support 10 that is configured to removably support a pole, for example, removably supporting a pole 12 (see FIGS. 3 to 5) of a roadside signboard.

The pole support 10 includes a tubular housing 14 defining a socket 16 for receiving the pole 12. The housing 14 comprises an annular side wall 18 having a base plate 20 closing off its operative lower end 22. An opposed operative upper end 24 of the housing 14 is open allowing the pole 12 to be inserted into the socket 16. A drain hole 26 is provided in the base plate 20 to allow drainage of water that may accumulate in the socket 16, e.g. rain water that may flow in through the open upper end 24.

A lower guide annulus 28 is provided in the socket 16 and located towards the lower end 22, while an upper guide annulus 30 is provided in the socket 16 and located towards the upper end 24. In the exemplary embodiment, the lower guide annulus 28 is shown in abutting contact with the base plate 20, while the upper guide annulus 30 is shown being flush with the upper end 24. The guide annuluses 28, 30 are identical to each other, apart from being in inverted orientation when inserted into the socket, thus any guide annulus can be used in either position.

The guide annuluses 28, 30 are in press fit within the housing 14 and held against the side wall 18 by frictional contact. In this regard, the side wall 18 is made of metal, plastics or any other suitable material, while the guide annuluses 28, 30 are made of plastics, cement or resin-based material. The outer annular dimension of the guide annuluses 28, 30 is slightly larger than the inner annular dimension of the side wall 18 so that the guide annuluses 28, 30 are in a tight fit when inserted under force into to the socket 16. The guide annuluses 28, 30 have a tapered outer wall 32 that is configured to assist in initially inserting the guide annuluses 28, 30 into the socket 16. Thus the terminal end of the tapered outer wall 32 has an outer annular dimension being smaller than the inner annular dimension of the side wall 18.

Figure 5:
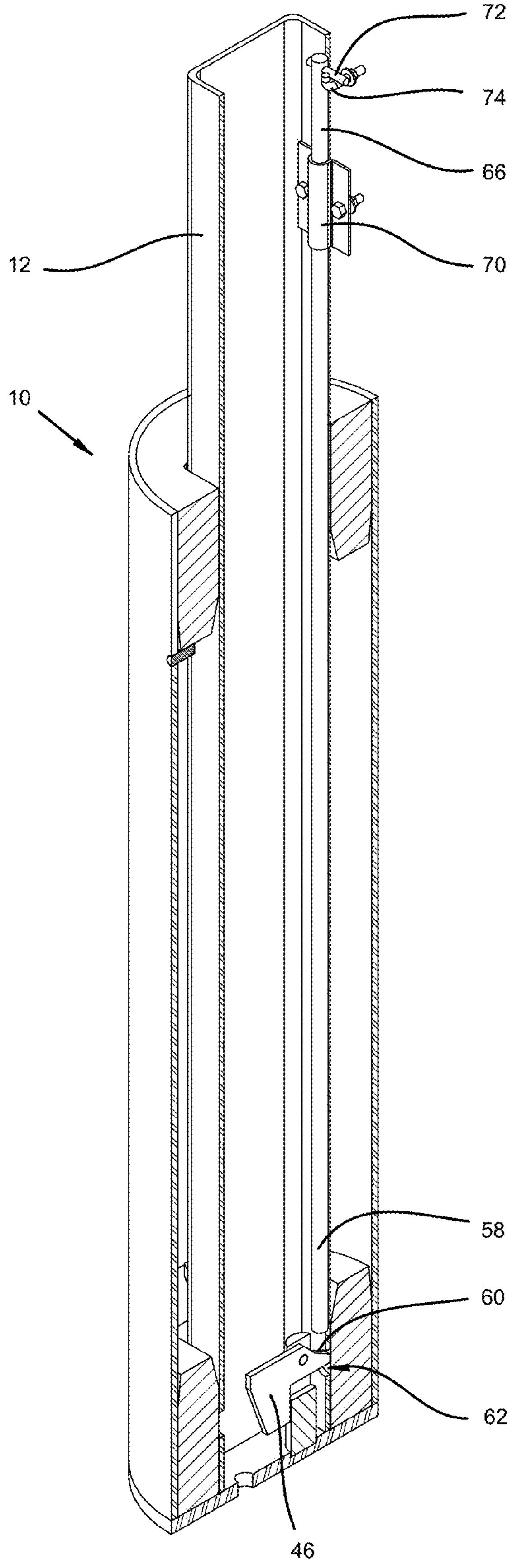
FIG. 5 is a perspective view of a further embodiment of the pole support showing a mounting arrangement for the release rod.

In one example, the guide annuluses 28, 30 can be secured to the side wall 18 by an adhesive. In another example, the guide annuluses 28, 30 can be secured to the side wall 18 by screws or bolts. As shown in FIGS. 3 and 5, a grub screw or pin 34 can extend through the side wall 18 to ensure the upper guide annulus 30 is inserted into the socket 16 to the desired extent. A similar pin (not shown) can be used to correctly position the lower guide annulus 28. Alternatively, the lower guide annulus 28 can be secured directly to the base plate 20 to prevent the lower guide annulus 28 from being inserted too deep within the socket 16. For example, the exemplary embodiment (FIG. 2) shows the lower guide annulus 28 being fixed to the base plate 20 by one or more bolt and nut assemblies 36.

Each guide annulus 28, 30 respectively defines through-holes 38, 40 which have a cross-sectional shape being complementary to a cross-sectional shape of the pole 12. The example shown in FIG. 1 has substantially rectangular through-holes 38, 40. In other examples, the through-holes 38, 40 can have a square or circular cross-sectional shape. The guide annuluses 28, 30 each have a tapered inner wall 42 leading into its through hole 38, 40. In respect of the lower guide annulus 28, its tapered inner wall 42 is configured to assist in directing the pole 12 into its through-hole 38 when the pole 12 is initially lowered into the socket 16.

Figure 2:
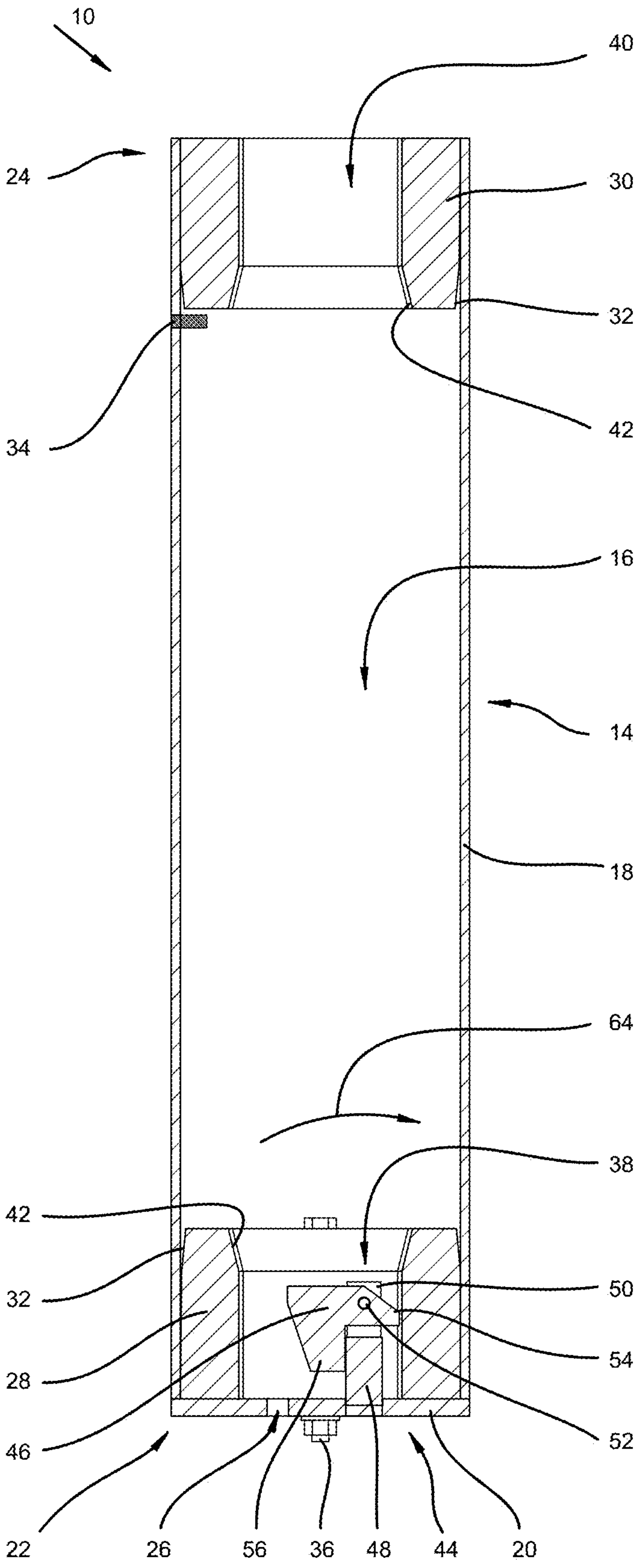
FIG. 2 is a cross-sectional side view of the pole support of FIG. 1 showing a locking mechanism therein.
Figure 3:
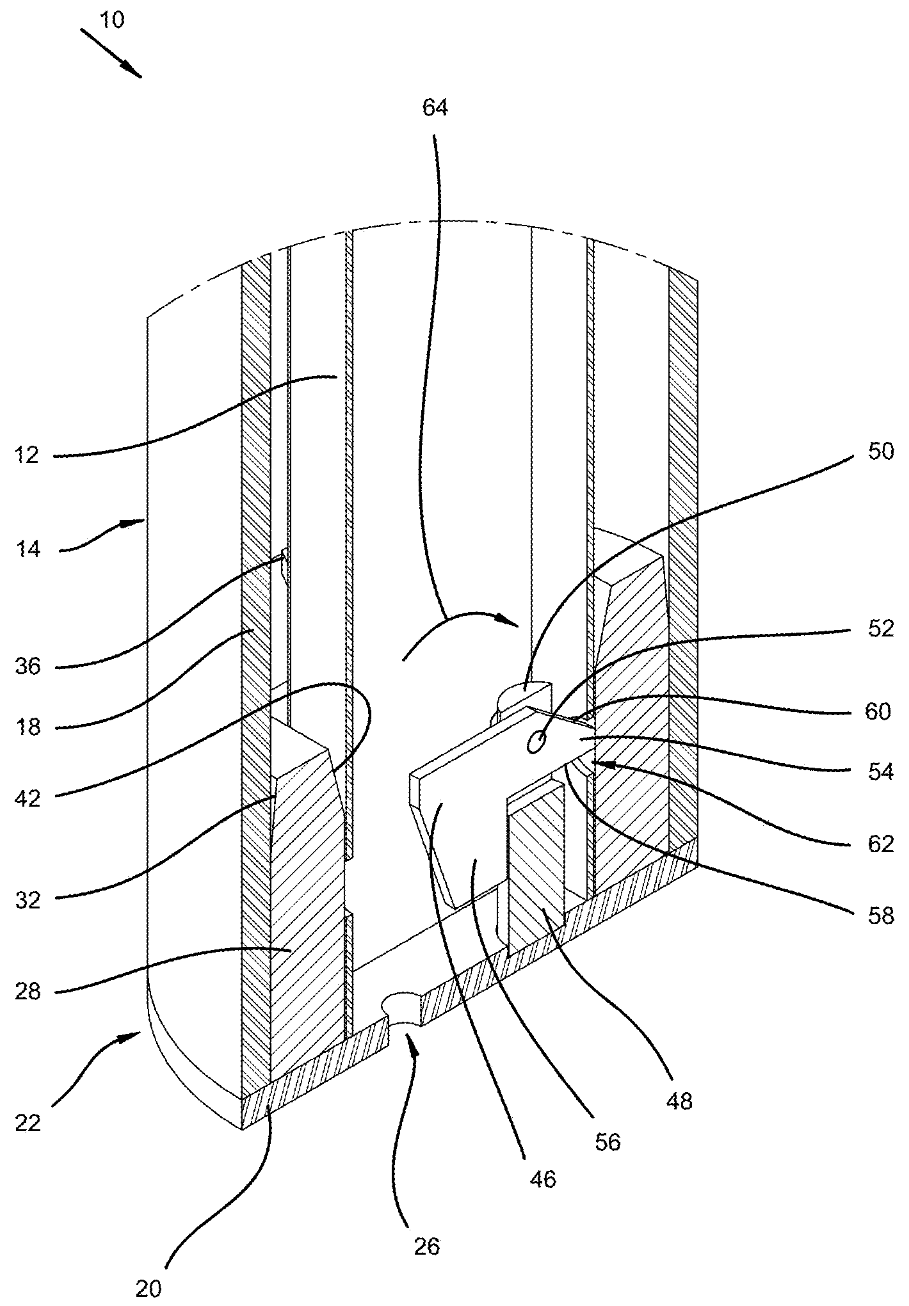
FIG. 3 is an enlarged partial cross-sectional perspective view of a lower part of the pole support of FIGS. 1 and 2, shown supporting a pole and with the locking mechanism in latched position.

As can be seen in FIGS. 2 and 3, the pole support 10 further comprises a locking mechanism 44 configured to secure the pole 12 in place once fully inserted into the socket 16. The locking mechanism 44 comprises a gravity latch 46 that is pivotally mounted on post 48 that projects from base plate 20. Post 48 is in the shape of a yoke having two opposed legs 50 supporting a transverse pivot pin 52 therebetween, with the latch 46 being pivotally mounted on the pivot pin 52. Latch 46 has its centre-of-weight being off-centred from the pivot pin 52 so that weight of latch 46 is normally biased under gravity to pivot into its latched position. Latch 46 is retained in its latched position by being in abutting contact with the pole 12.

The exemplary embodiment of latch 46 is of generally L-shaped configuration and comprises a latching arm 54 extending towards a proximal side of pivot pin 52 and a ballast arm 56 extending towards a distal side of pivot pin 52. Latching arm 54 defines a lower latching edge 58 and an upper strike edge 60. Latching arm 54 is dimensioned so that, when in its latched position, it extends laterally through a latching recess or hole 62 provided in the pole 12 (see FIG. 3). The latching edge 58 is configured to extend substantially perpendicularly transversely to the socket 16 when the latching arm 54 is in its latched position so that latching arm 54 forms a barrier to removal of the pole 12. In one example, the strike edge 60 can be orientated parallel to the latching edge 58. However, the exemplary example shows strike edge 60 being orientated obliquely to latching edge 58 so that the latching arm 54 converges in to truncated wedge point.

In use, pole support 10 can be buried in the ground so that its upper end 24 is co-planar with the ground surface. If desired, pole support 10 can be fully or partially embedded in a concrete foundation. Alternatively, pole support 10 can be embedded in a suitably heavy mobile concrete base for location on top of the ground or other operative surface.

When no pole 12 is located within pole support 10, latch 46 pivots under gravity to its default latched position (as shown in FIG. 2).

In use, pole 12 is inserted into socket 16 by sliding lower end of pole 12 through the through-holes 38, 40 of the guide annuluses 28, 30. Tapered inner wall 42 assist in guiding the end of pole 12 into the through-hole 38 of lower guide annulus 28. As pole 12 slides down towards the locking mechanism 44, pole 12 contacts against the strike edge 60 of latch 46 whereafter the weight effect of pole 12 exceeds the biasing weight of ballast arm 56 and therefore causes latch 46 to pivot in the direction of arrow 64 away from its default latched position, i.e. rotating latching arm 54 further inwardly of socket 16 into its unlatched position. Pole 12 is then able to slide past latching arm 54 until it abuts base plate 20, at which time latching arm 54 encounters latching hole 62. Subsequently the weight of ballast arm 56 biases latch 46 to pivot in the reverse direction of arrow 64 back into its latched position with ballast arm 56 coming to rest in abutting contact with post 48—thereby latching support pole 12 (as shown in FIG. 3).

In its latched position, the exemplary embodiment of latching arm 54 projects fully through latching hole 62. In other embodiments, latching arm 54 may be dimensioned to extend only partially into latching hole 62 provided latching arm 54 is able to form a barrier to removal of pole 12. Accordingly, if an attempt is made to pull pole 12 out from socket 16, pole 12 will abut latching edge 58 and latching arm 54 will prevent further upward movement and removal of pole 12 from the pole support 10.

Figure 4:
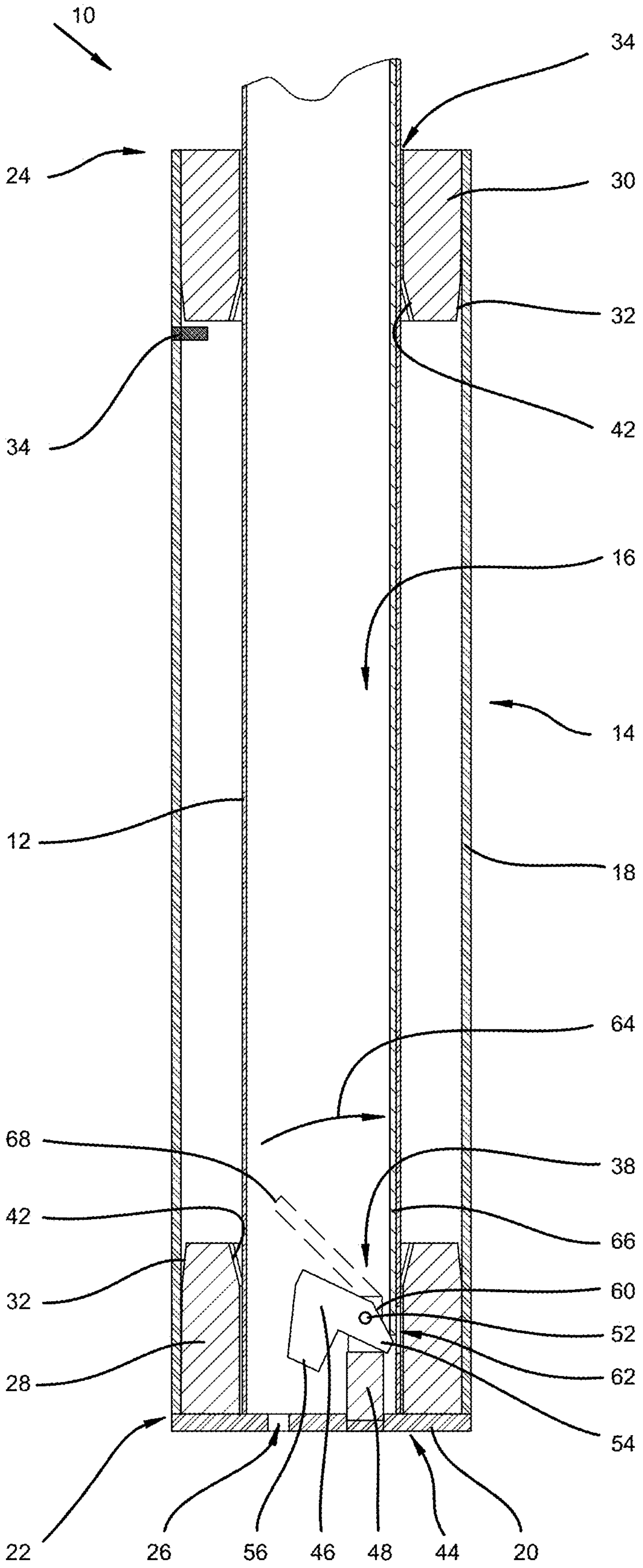
FIG. 4 is a cross-sectional perspective view of the pole support of FIGS. 1 and 2, shown supporting a pole and with the locking mechanism being moved into an unlatched position by a release rod.

Referring now to FIGS. 4 and 5, removal of pole 12 requires a release rod 66 to be lowered into pole support 10 within pole 12 so that release rod 66 abuts strike edge 60 and, in a similar manner to the insertion of pole 12, causes latch 46 to again pivot in the direction of arrow 64 towards it unlatched position (shown in FIG. 4). In one embodiment, release rod 66 is an elongated separate rod, tube or strip of flat bar that is hand manipulated by a worker through the top of pole 12 and applying the requisite force to pivot latch 46 to its unlatched position.

In another embodiment, release rod 66 is simply aimed towards latching arm 54 and dropped down within pole 12, whereby the weight effect (or momentum) of release rod 66 is sufficient to overcome the biasing weight of ballast arm 56 so that latch 46 is pivoted into its unlatched position. In this case, pole 12 may be provided with guide slots or brackets for guiding release rod 66 towards the strike edge 60. Alternatively, other embodiments may include a slanted guide ramp 68 (shown in dashed outline in FIG. 4) extending from the legs 50 of post 48, along which the release rod 66 can slide after being dropped so that it is directed towards the latching arm 54. Release rod 66 will then typically come to rest on base plate 20.

Once latch 46 is pivoted by release rod 66 to its unlatched position, release rod 66 remains located between lathing arm 54 and latching hole 62 so that latching arm 54 is not able to re-enter latching hole 62. Pole 12 can then be pulled upwards out of socket 16 while release rod 66 simply slidably exits through the bottom of pole 12. Release rod 66 can then be retrieved from socket 16 once pole 12 is fully removed from pole support 10.

In yet a further embodiment exemplified in FIG. 5, release rod 66 can be mounted internally within pole 12 by saddle bracket 70, whereby bracket 70 also aligns release rod 66 with latching arm 54. Release rod 66 has a lug 72 projecting transversely therefrom that rests on hook 74 so that release rod 66 is held in a raised position spaced above latch 46. When removal of the pole 12 is required, hook 74 is manipulated from outside the pole 12 and disengaged from lug 72 thereby allowing release rod 66 to fall onto latch 46 under gravity to pivot latch 46 into its unlatched position. In another similar embodiment lug 72 may define a handle projecting through an elongated vertical slot in pole 12 so that a worker can move release rod 66 as needed without depending on gravity.

Figure 6:
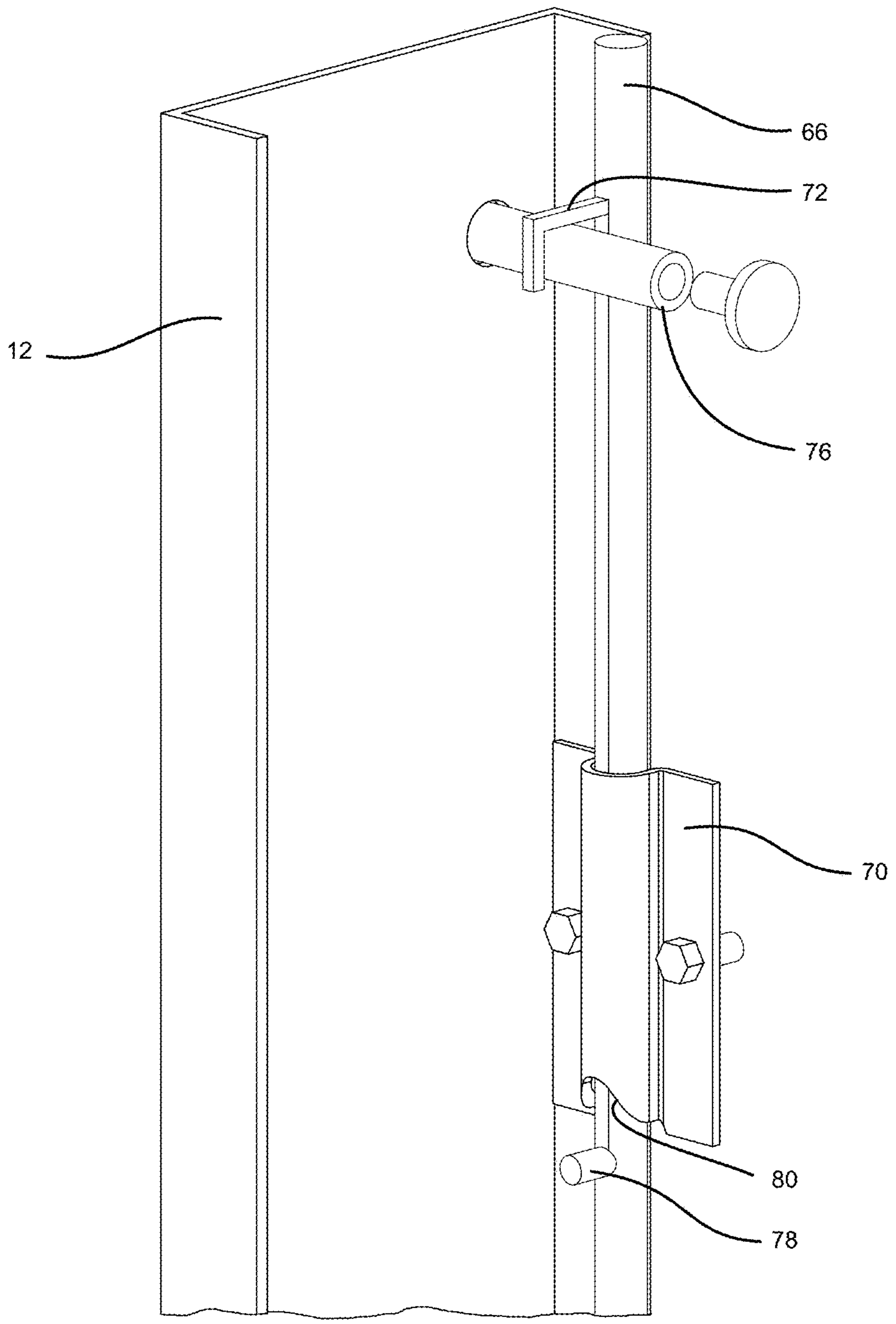
FIG. 6 is a perspective view showing an alternative mounting arrangement for the release rod.

FIG. 6 shows an alternative mounting arrangement for supporting the release rod 66 within pole 12. In this case, lug 72 initially rests on a bolt 76 that extends transversely through pole 12. Bolt 76 can be an anti-tamper type bolt, such as having a torx-type head or a triwing-type head, to prevent it from being removed by unauthorised persons. Lug 72 is L-shaped having a bent off end that extends partially around bolt 76, which prevents axial rotation of the release rod 66 that could result in lug 72 inadvertently sliding off bolt 76. In use, when pole 12 is to be removed from pole support 10, bolt 76 is removed to disengage from lug 72 thereby allowing release rod 66 to fall onto latch 46 under gravity and cause latch 46 to pivot into its unlatched position. Lug 72 is spaced sufficiently far from saddle bracket 70 so that release rod 66 will come to rest on base plate 20 before lug 72 can contact against saddle bracket 70.

Once pole 12 has been removed, release rod 66 can be returned to its initial position (shown in FIG. 6) by either pushing it back manually or by inverting pole 12 so that release rod 66 can slide back under gravity. A stud 78 projects from release rod 66 with the stud 78 being located on an opposed side of saddle bracket 70 from the lug 72. Further, saddle bracket 70 has a curved key slot 80 therein facing towards stud 78. As release rod 66 slides back to its initial position (i.e. upwards in FIG. 6), stud 78 will contact and slide along key slot 80, thereby firstly correctly rotationally aligning release rod 66 and lug 72 within pole 12 and secondly acting as a stop preventing further sliding of release rod 66. While still inverted, or manually pushed back and held in position, bolt 76 can be replaced, whereafter pole 12 can be returned to its normal orientation and allow lug 72 to again rest on bolt 76 in its initial position ready to be reinserted into the same or another pole support 10.

According to one aspect of the present disclosure, a pole support for removably supporting a hollow tubular pole with a latching recess provided along its length includes a housing that defines a socket. The socket is open at its operative upper end to receive the hollow tubular pole. A latch is located within the socket and is mounted on a pivot and pivotally movable between a latched position and an unlatched position. The latch includes a latching arm that extends on one side of the pivot and a ballast arm that extends on an opposed side of the pivot. A centre-of-weight of the latch is located off-centre from the pivot in the ballast arm. The ballast arm is configured to normally bias latch into the latched position. In use, the latching arm is configured to extend into the latching recess of the hollow tubular pole that is supported within the socket.

According to another aspect of the present disclosure, a housing includes a tubular side wall and a base plate closing off its operative lower end.

According to yet another aspect of the present disclosure, a housing includes guide annuluses within a socket.

According to still another aspect of the present disclosure, a housing includes an upper guide annulus located at or near an upper end of the housing. A lower guide annulus is located at or near a lower end of the housing.

According to another aspect of the present disclosure, guide annuluses are in a press fit within a housing and held against a tubular side wall by a frictional fit.

According to another aspect of the present disclosure, guide annuluses define through-holes that have a cross-sectional shape complementary to a cross-sectional shape of a hollow tubular pole to be supported within a socket.

According to yet another aspect of the present disclosure, guide annuluses have a tapered inner wall leading into through-holes.

According to still another aspect of the present disclosure, a latch and pivot are mounted on a post that extends from a housing into a socket.

According to another aspect of the present disclosure, a pivot includes a pivot pin that extends transversally through a post.

According to another aspect of the present disclosure, a latching arm includes a latching edge on an operative lower side of the latching arm and a strike edge on an operative upper side of the latching arm.

According to yet another aspect of the present disclosure, a latching edge is configured to extend substantially perpendicularly transversely to an axial insertion direction of a hollow tubular pole when a latch is in a latched position so that, in use, a latching arm forms a barrier against removal of the hollow tubular pole.

According to another aspect of the present disclosure, a strike edge is orientated obliquely to a latching edge so that a latching arm converges to a truncated wedge point.

According to another aspect of the present disclosure, a latch is configured to pivot from a latched position to an unlatched position by a hollow tubular pole sliding axially into a socket and contacting a latching arm to overcome a biasing force of a ballast arm.

According to still another aspect of the present disclosure, a latch is configured to pivot from an unlatched position to a latched position once a latching arm encounters a latching recess in a hollow tubular pole. The latch is configured to pivot under the weight of a ballast arm after the hollow tubular pole no longer contacts the latching arm.

According to yet another aspect of the present disclosure, a release rod is arranged to move a latch into an unlatched position and allow removal of a hollow tubular pole.

According to another aspect of the present disclosure, a release rod is located internally within a hollow tubular pole and is configured to be lowered into a socket so that the release rod can contact a latching arm and overcome a bias of a ballast arm to move a latch into an unlatched position.

According to another aspect of the present disclosure, a release rod is separate from a housing.

According to another aspect of the present disclosure, a housing includes a slanted guide ramp configured to direct a release rod towards a latching arm.

According to still another aspect of the present disclosure, a release rod is slidably attached to a hollow tubular pole by a bracket configured to direct the release rod towards a latching arm.

It will be appreciated by persons skilled in the art that numerous variations and/or modifications may be made to the pole support as shown in the specific embodiments without departing from the spirit or scope of the disclosure as broadly described. The present embodiments are, therefore, to be considered in all respects as illustrative and not restrictive.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A pole support for removably supporting a hollow tubular pole, wherein said hollow tubular pole has a latching recess provided along its length, said pole support comprising:

a housing defining a socket, the socket being open at its operative upper end for receiving said hollow tubular pole; and a latch located within the socket and being mounted on a pivot and pivotally movable between a latched position and an unlatched position, the latch comprising a latching arm extending on one side of the pivot and a ballast arm extending on an opposed side of the pivot, and wherein a centre-of-weight of the latch is located off-centre from the pivot in the ballast arm, whereby the ballast arm is configured to normally bias latch into the latched position, and wherein, in use, the latching arm is configured to extend into the latching recess of said hollow tubular pole supported within the socket, and further wherein the latch is configured, during use, to be pivoted from the latched position to the unlatched position by said hollow tubular pole sliding axially into the socket and contacting the latching arm to overcome the biasing force of the ballast arm.

2. The pole support of claim 1, wherein the housing comprises a tubular side wall and a base plate closing off its operative lower end.

3. The pole support of claim 2, wherein the housing comprises guide annuluses within the socket.

4. The pole support of claim 3, wherein the housing comprises an upper guide annulus located at or near an upper end of the housing, and wherein the housing further comprises a lower guide annulus located at or near a lower end of the housing.

5. The pole support of claim 3, wherein the guide annuluses are in a press fit within the housing and held against the tubular side wall by a frictional fit.

6. The pole support of claim 3, wherein the guide annuluses define through-holes having a cross-sectional shape complementary to a cross-sectional shape of said hollow tubular pole to be supported within the socket.

7. The pole support of claim 6, wherein the guide annuluses have a tapered inner wall leading into the through-holes.

8. The pole support of claim 1, wherein the latch and pivot are mounted on a post extending from the housing into the socket.

9. The pole support of claim 8, wherein the pivot comprises a pivot pin extending transversally through the post.

10. The pole support of claim 1, wherein the latching arm comprises a latching edge on an operative lower side of the latching arm, and wherein the latching arm further comprises a strike edge on an operative upper side of the latching arm.

11. The pole support of claim 10, wherein the latching edge is configured to extend substantially perpendicularly transversely to an axial insertion direction of said hollow tubular pole when the latch is in the latched position so that, in use, the latching arm forms a barrier against removal of said hollow tubular pole.

12. The pole support of claim 10, wherein the strike edge is orientated obliquely to the latching edge so that the latching arm converges to a truncated wedge point.

13. The pole support of claim 1, wherein the latch is configured to pivot from the unlatched position to the latched position once the latching arm encounters the latching recess in said hollow tubular pole, whereby the latch is configured to pivot under the weight of the ballast arm after said hollow tubular pole no longer contacts the latching arm.

14. The pole support of claim 1, further comprising:

a release rod arranged to move the latch into the unlatched position and allow removal of said hollow tubular pole.

15. The pole support of claim 14, wherein the release rod is located internally within said hollow tubular pole and configured to be lowered into the socket so that the release rod can contact the latching arm and overcome the bias of the ballast arm to move the latch into the unlatched position.

16. The pole support of claim 14, wherein the release rod is separate from the housing.

17. The pole support of claim 16, wherein the housing comprises a slanted guide ramp configured to direct the release rod towards the latching arm.

18. The pole support of claim 14, wherein the release rod is slidably attached to said hollow tubular pole by a bracket configured to direct the release rod towards the latching arm.

* * * * *